United States Patent Office 2,905,694
Patented Sept. 22, 1959

2,905,694

CERTAIN ESTERS OF 1,2-DIARYL, 3-HYDROXY, 4-SUBSTITUTED PYRAZOLINE-5-ONES

Ellis Rex Pinson, Jr., Jackson Heights, N.Y., assignor to Chas. Pfizer & Co., Inc., New York, N.Y., a corporation of Delaware No Drawing. Application May 2, 1958
Serial No. 732,426

5 Claims. (Cl. 260—310)

This application is concerned with new and useful derivatives of pyrazolone corresponding to the following formula:

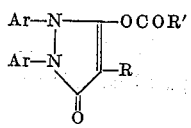

In the above formula R is from the group consisting of alkyl and alkenyl of up to 5 carbon atoms, cycloalkyl of from 5 to 6 carbon atoms and aralkyl of from 7 to 8 carbon atoms; Ar may be phenyl or substituted phenyl in which the substituent is chlorine or lower alkyl or lower alkoxy of from 1 to 3 carbon atoms and R' is from the group consisting of alkyl of 1 to 5 carbon atoms, alkoxy of from 1 to 3 carbon atoms, phenyl and substituted phenyl in which the substituent is selected from the group consisting of alkyl and alkoxy containing from 1 to 3 carbon atoms. Of course, the specified carbon content of the above groups represents preferred substituents and is not meant to exclude related groups of higher carbon content. The above described preferred substituents are prepared employing readily available intermediates and, for this reason, are preferred.

The pyrazolone derivatives of the present invention, which may be defined generally as 1,2-diaryl-3-acyloxy-4-hydrocarbon-substituted pyrazolones, may be prepared by the reaction of corresponding 1,2-diaryl-4-hydrocarbon-substituted-pyrazolidine-3,5-diones with an acid halide of the following formula:

R'COX in which X is halogen and R' is as defined above.

The reaction is effected by procedures commonly employed in the art. For example, the selected substituted pyrazolidinedione is dissolved in an inert solvent and reacted with a suitable organic acid chloride in the presence of an organic base. Tertiary amines are suitable organic bases to be employed in the preparation of the compounds of this invention. Exemplary of tertiary amines are trialkyl amines such as triethyl amine, tripropyl amine, tributyl amine, etc.; alkylaryl amines such as dimethyl aniline, diethyl aniline, and so forth. The reaction is usually effected at room temperature for a period of from about 1 to 2 hours. Chloroform is a particularly suitable solvent although other halogenated hydrocarbons may be employed. The reaction may be effected by employing a 1:1 molar ratio of the reactants in the presence of excess tertiary amine. It is generally preferred to employ slight excesses of the acid chloride, for example, excesses up to 20%. Stirring is usually found helpful but not essential since it provides a more intimate contact of the reagents. After the reaction is complete, the product is obtained, after removal of excess amine with dilute aqueous acid, by evaporation of the solvent. The residue may be crystallized by trituration in petroleum ether and then recrystallized by standard procedures from suitable organic solvents. A mixture of benzene and petroleum ether is especially suitable for recrystallization of most of the products.

The 1,2-diaryl-4-hydrocarbon-substituted pyrazolidine-3,5-diones employed in the preparation of the compounds of this invention may be prepared by standard procedures well known in the art. Generally, these compounds which may be represented by the following formula

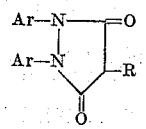

may be made by the reaction of a monosubstituted malonic acid derivative of the general formula:

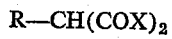

in which X is halogen or an alkoxy group, with a 1,2-diarylhydrazine of the formula:

The reaction is usually carried out in the presence of a condensing agent. Suitable condensing agents are alkali metals and active alkali metal compounds, for example, metallic sodium, sodium ethoxide, potassium ethoxide, sodium amide and the like.

When a malonic acid chloride is employed it is suggested to use an organic base to absorb hydrogen halide as it forms. Suitable organic bases are tertiary amines such as those mentioned above.

The compounds of the present invention are convenient and valuable analgesic, antipyretic and/or anti-inflammatory properties. Pyrazolidinediones of the type described above have been known as therapeutics with an analgesic and antipyretic action. Their use, however, is considerably limited since they are found to have appreciable toxic effects. The compounds of the present invention, however, have appreciably reduced toxicity in comparison with the already known pyrazolidinedione derivatives and consequently are more desirable for use in human therapy.

The compounds of the present invention are conveniently administered in composition form. Such compositions include a pharmaceutical carrier selected on the basis of the chosen route of administration and standard pharmaceutical practice. For example, they may be administered orally in the form of tablets containing such excipients as starch, milk sugar, certain types of clay, etc. They may be administered in capsules, in admixtures with the same or equivalent excipients. They may also be administered orally in the form of oral suspensions which may contain flavoring and coloring agents. They may be injected parenterally, i.e. for example, intramuscularly or subcutaneously. For oral administration of the therapeutic agents of this invention, tablets or capsules containing from about 25 to about 200 mg. are suitable for most applications.

The physician will determine the dosage which will be most suitable for an individual patient and it will vary with the form of administration, the age, weight, and response of the particular patient. Generally, however, the initial dosage in adults may range from 300 to 600 mg. per day divided into 3 or 4 equal doses. In many instances, it is not necessary to exceed 400 mg. daily. After the initial dosage, the maintenance dosage may often be achieved with as little as 100 to 200 mg. daily.

The following examples are given by way of illustration and are not to be construed as limitations of this invention many variations of which are possible within the scope and spirit thereof.

EXAMPLE I

To 5 g. of 4-butyl-1,2-diphenylpyrazolidine-3,5-dione dissolved in 50 ml. of chloroform was added 6.7 ml. of diethylamine. To this mixture was added 2.48 ml. of o.tolyl chloride dissolved in 10 ml. chloroform and the mixture stirred at room temperature for ½ hour.

The mixture was then extracted with dilute aqueous hydrochloric acid washed with water and dried. Evacuation of the dry chloroform solution gave a residue which on trituration with petroleum ether gave 4.75 g. of 1,2-diphenyl-3-o.toluyloxy-4-butylpyrazolone, melting point 95° to 96° C.

Elemental analysis of product gave the following results:

Calcd. for $C_{27}H_{26}N_2O_3$: C, 76.03; H, 6.15; N, 6.57.
Found: C, 75.82; H, 6.40; N, 6.69.

EXAMPLE II

The procedure of Example I was repeated employing benzoyl chloride in place of o.toluyl chloride. The product, 1,2-diphenyl-3-benzoyloxy-4-butylpyrazolone, after recrystallization from benzene and petroleum ether, melted at 115°–116° C.

Elemental analysis gave the following results:

Calcd. for $C_{26}H_{24}N_2O_3$: C, 75.70; H, 5.87; N, 6.79.
Found: C, 75.33; H, 5.95; N, 6.90.

EXAMPLE III

The procedure of Example I was repeated employing isobutyryl chloride in place of o.toluyl chloride. The product, 1,2-diphenyl-3-isobutyryloxy-4-butylpyrazolone was obtained. After recrystallization from benzene petroleum ether from the mixture melted at 120°–130° C.

EXAMPLE IV

The procedure of Example I was repeated employing ethylchloroformate in place of o.toluyl chloride. The product, ethyl 1,2-diphenyl-4-butylpyrazolonyl-3-carbonate melted at 65.5°–67.5° C.

EXAMPLE V

Employing the procedure of Example I the following compounds are prepared from a suitable acid chloride and 1,2-diaryl-4-hydrocarbon-substituted-pyrazolidine-3,5-dione:

*General formula*

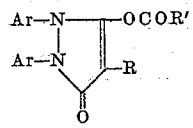

| R' | R | Ar |
|---|---|---|
| $CH_3$ | $C_6H_5CH_2$ | $C_6H_5$ |
| $CH_3O$ | $isoC_4H_9$ | $p.ClC_6H_4$ |
| $p.CH_3OC_6H_4$ | $CH_3-CH=CH_2$ | $p.CH_3OC_6H_4$ |
| $C_3H_7O$ | $C_5H_{11}$ | $p.CH_3C_6H_4$ |
| $C_5H_{11}$ | Cyclopentyl | $p.C_2H_5C_6H_4$ |
| $IsoC_4H_9$ | $CH_3$ | $p.IsoC_3H_7C_6H_4$ |
| $OC_2H_5$ | $C_4H_9$ | $p.C_3H_7OC_6H_4$ |
| $C_3H_7$ | Pentenyl | $C_6H_5$ |
| $p.C_3H_7OC_6H_4$ | $C_6H_5C_2H_4$ | $C_6H_5$ |
| $CH_3$ | Cyclohexyl | $C_6H_5$ |

EXAMPLE VI

A mixture of 65 parts of diethyl-n-butylmalonate and 55 parts of hydrazobenzene is added to a solution of 7.6 parts of sodium dissolved in 200 ml. of absolute alcohol. The alcohol is slowly distilled off and the mixture heated for 12 hours at a temperature of 150° C. The last traces of alcohol are removed at reduced pressure. The product is dissolved in water and acidified with dilute hydrochloric acid to separate the product, 1,2-diphenyl-4-butylpyrazolidine-3,5-dione, as an oil which crystallizes on standing. Recrystallization from ethanol gave pure product.

The other 1,2-diaryl-4-hydrocarbon-substituted pyrazolidine-3,5-diones employed in the above examples, are prepared employing this procedure.

EXAMPLE VII

A tablet base was prepared by blending the following ingredients in the proportion by weight indicated.

| | |
|---|---|
| Sucrose, U.S.P. | 80.3 |
| Tapioca starch | 13.2 |
| Magnesium stearate | 6.5 |

Into this base there was blended sufficient 1,2-diphenyl-3-o.toluyloxy-4-butylpyrazolone to provide tablets each containing 100 mg. of active ingredient.

EXAMPLE VIII

Into the tablet base of Example VII there was blended a sufficient amount of 1,2-diphenyl-3-benzoyloxy-4-butylpyrazolone to provide tablets each containing 200 mg. of active ingredient.

EXAMPLE IX

A blend was prepared containing the following ingredients:

| | Grams |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.32 |
| 1,2-diphenyl-3-benzoyloxy-4-butylpyrazolone | 20. |

This blend was divided and formed into capsules and containing 25 mg. of active ingredient.

EXAMPLE X

A tablet base was prepared by blending the following ingredients in the proportion by weight indicated:

| | |
|---|---|
| Sucrose, U.S.P. | 82.0 |
| Tapioca starch | 13.6 |
| Magnesium stearate | 4.4 |

Into this tablet base was blended sufficient amount of 1,2-diphenyl-3-isobutyryloxy-4-butylpyrazolone to provide tablets containing 100 mg. of active ingredient.

EXAMPLE XI

To the tablet base of Example X was added sufficient 1,2-diphenyl-3-o.toluyloxy-4-butylpyrazolone to provide tablets each containing 25 mg. of active ingredient.

What is claimed is:

1. A compound selected from the group represented by the following formula:

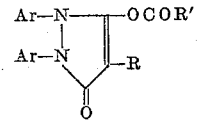

in which Ar is from the group consisting of phenyl and substituted phenyl in which the substituent is selected from the group consisting of chlorine and alkyl and alkoxy of from 1 to 3 carbon atoms; R is from the group consisting of alkyl and alkenyl of up to 5 carbon atoms, cycloalkyl of from 5 to 6 carbon atoms and aralkyl of from 7 to 8 carbon atoms; and R' is from the group consisting of alkyl containing from 1 to 5 carbon atoms, alkoxy containing from 1 to 3 carbon atoms, phenyl, and substituted phenyl in which the substituent is selected from the group consisting of alkyl and alkoxy containing from 1 to 3 carbon atoms.

2. 1,2-diphenyl-3-o.toluyloxy-4-butylpyrazolone.

3. 1,2-diphenyl-3-benzoyloxy-4-butylpyrazolone.
4. 1,2-diphenyl-3-isobutyryloxy-4-butylpyrazolone.
5. 1,2-diphenyl-4-butylpyrazolonyl-3-carbonate.

References Cited in the file of this patent

FOREIGN PATENTS 681,376    Great Britain _____ Oct. 22, 1952

OTHER REFERENCES

Whilhelmi et al.: Chem. Abstracts, vol. 45, col. 3941 (1951).

Gagnon et al.: Chem. Abstracts, vol. 45, col. 4711 (1951).